(No Model.)
C. DORIOT.
ELECTRIC MOTOR.
No. 344,643. Patented June 29, 1886.
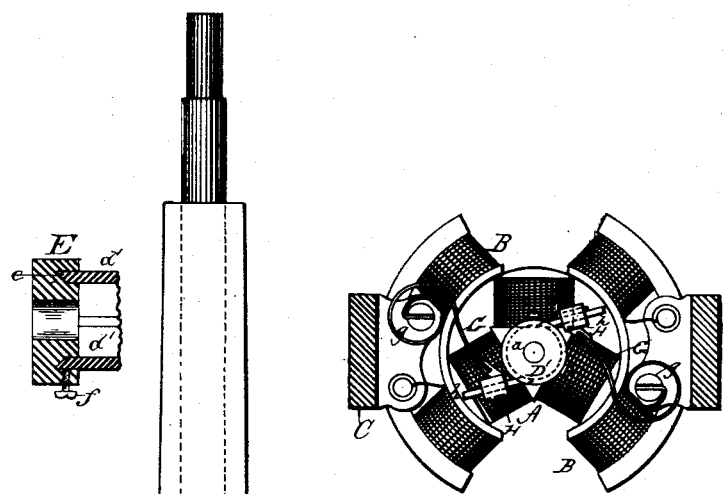
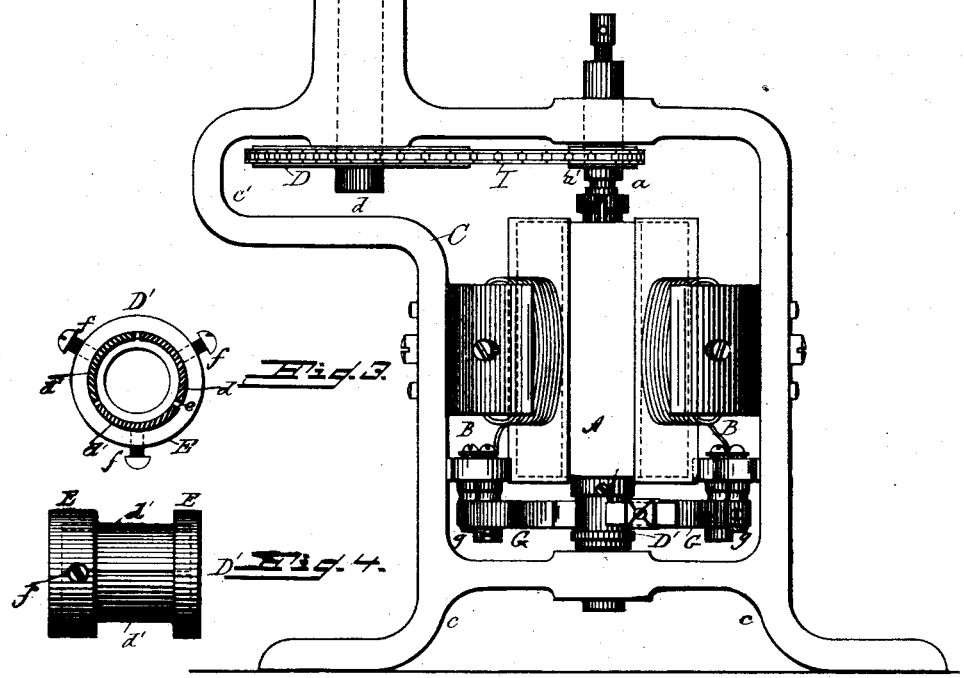
WITNESSES:
INVENTOR
Constant Doriot,
By Connolly Bros.
Attorneys

UNITED STATES PATENT OFFICE.

CONSTANT DORIOT, OF PHILADELPHIA, PENNSYLVANIA.

ELECTRIC MOTOR.

SPECIFICATION forming part of Letters Patent No. 344,643, dated June 29, 1886.

Application filed September 29, 1885. Serial No. 178,525. (No model.)

*To all whom it may concern:*

Be it known that I, CONSTANT DORIOT, a citizen of the Republic of France, residing at Philadelphia, in the county of Philadelphia and State of Pennsylvania, have invented certain new and useful Improvements in Electric Motors; and I do hereby declare the following to be a full, clear, and exact description of the invention, reference being had to the accompanying drawings, which form part of this specification, in which—

Figure 1 is a side elevation of motor. Fig. 2 is a transverse section through frame, showing an end view of commutator end of motor. Fig. 3 is a transverse section; Fig. 4, a side elevation of commutator, and Fig. 5 is a longitudinal sectional view of a portion of the commutator.

My invention relates, particularly, to small electric motors designed and adapted to communicate motion to ventilating-fans and to run light machinery—such as dental-drills, sewing-machines, &c.

My improvements have reference particularly to the following points: First, to the construction of the frame, which is made so as to support the magnets and armature and to afford bearings for a driven shaft separate from but geared with the armature-shaft; second, to the peculiar construction of the brushes, whose fixed ends are coiled, their rubbing ends having boxes which sustain contact or rubbing plates, substantially as hereinafter fully set forth.

Referring to the accompanying drawings, A represents a rotary armature, and B B the field-magnets of an electric motor, which said parts may be of the usual or any suitable construction.

C represents the frame in which the armature-shaft $a$ has its bearings and on which the magnets B B are supported. Said frame is a forging or may be a casting. It has two projections, $c\ c$, at one end, which serve as feet if the frame be used as a stand, or as lugs by which said frame may be fastened to a ceiling or rafter if used as a hanger. Said frame is formed with an offset, at $c'$, to afford space for a sprocket-wheel, D, which is secured to a shaft, $d$, and is connected by a drive-chain, I, with a smaller sprocket-wheel, $a'$, on armature-shaft $a$. The shaft $d$ has its bearings in an elongated boss or sleeve, $c^2$, which is made integral with the frame C, adding to the mass of said frame and increasing its magnetic capacity.

The commutator is shown at D', and consists of a series of separated segmental plates, $d'$, whose ends rest in annular grooves $e\ e$, which taper or lessen in width as they descend, said grooves being formed in heads E E, composed of vulcanized fiber or equivalent insulating material. Screws $f\ f$, which connect the commutator-plates with the wires of the armature, serve also to fasten the plates $d'$ and heads E E together. The tapering grooves in said heads act as wedges to draw the heads and plates close together when the former are fitted or driven on the latter.

G G are the brushes or brush-arms, whose inner ends are coiled, as shown, forming volutes, whereby additional resiliency is imparted to said brushes, causing them to bear with an elastic but sufficiently powerful pressure on the commutators. Said brushes are fastened in holders $g\ g$. At their opposite ends they carry or sustain boxes H, which contain leaves of copper $h\ h$, which serve as brush-contacts for the commutator, their edges bearing against the latter.

Instead of the sprocket-wheels D and $a'$ and the connecting-chain I, gear-wheels may be provided, meshing directly with one another. By varying the sizes of these wheels the speed or power of shaft $d$ may be regulated.

What I claim as my invention is as follows:

1. The frame of an electric motor, constructed with an offset, $c'$, and an elongated boss or sleeve, $c^2$, forming a bearing for a shaft or spindle, substantially as shown and set forth.

2. The combination, with the armature and magnets of an electric motor, of a frame forming a hanger or stand and having formed integral with it an elongated boss or sleeve for a shaft or spindle driven from the shaft of said armature, substantially as shown and described.

3. In an electric motor, the combination, with the commutator-heads E E, of insulating material, formed with tapering annular grooves $e\ e$, of the commutator-sections $d'$, fitting in said grooves, and the screws $ff$, passing through the periphery of one of said heads and bearing against said sections, substantially as described.

In testimony that I claim the foregoing I have hereunto set my hand this 8th day of September, 1885.

CONSTANT DORIOT.

Witnesses:
R. DALE SPARHAWK,
M. D. CONNOLLY.